United States Patent
Nielsen et al.

(10) Patent No.: US 12,237,875 B2
(45) Date of Patent: Feb. 25, 2025

(54) FILTRATION FOR RADIO ACCESS TECHNOLOGIES

(71) Applicant: NOKIA TECHNOLOGIES OY, Espoo (FI)

(72) Inventors: Kim Nielsen, Storvorde (DK); Senad Bulja, Dublin (IE); Bent Henneberg Rysgaard, Aalborg (DK)

(73) Assignee: NOKIA TECHNOLOGIES OY, Espoo (FI)

(\*) Notice: Subject to any disclaimer, the term of this patent is extended or adjusted under 35 U.S.C. 154(b) by 517 days.

(21) Appl. No.: 17/448,966

(22) Filed: Sep. 27, 2021

(65) Prior Publication Data

US 2022/0124591 A1   Apr. 21, 2022

(30) Foreign Application Priority Data

Sep. 28, 2020   (FI) .................................. 20205934

(51) Int. Cl.
*H04B 17/345* (2015.01)
*H04W 36/14* (2009.01)
*H04W 36/30* (2009.01)

(52) U.S. Cl.
CPC ....... *H04B 17/345* (2015.01); *H04W 36/1446* (2023.05); *H04W 36/304* (2023.05)

(58) Field of Classification Search
CPC ..... H04W 88/06; H04W 36/14; H04W 36/30; H04W 84/12; H04W 48/18; H04W 24/02
See application file for complete search history.

(56) References Cited

U.S. PATENT DOCUMENTS

| | | | |
|---|---|---|---|
| 10,219,162 | B1* | 2/2019 | Sun .......................... H04B 1/50 |
| 2010/0118921 | A1 | 5/2010 | Abdelmonem et al. |
| 2011/0116490 | A1 | 5/2011 | Wilhelmsson et al. |
| 2011/0169589 | A1 | 7/2011 | Franzon et al. |
| 2012/0129457 | A1 | 5/2012 | Linsky |
| 2012/0307749 | A1 | 12/2012 | Baniseter et al. |

(Continued)

FOREIGN PATENT DOCUMENTS

| | | |
|---|---|---|
| EP | 3547792 A1 | 10/2019 |
| WO | WO 2019/173101 | 9/2019 |

OTHER PUBLICATIONS

"3rd Generation Partnership Project; Technical Specification Group Radio Access Network; NR; User Equipment (UE) radio transmission and reception; Part 1: Range 1 Standalone (Release 16)", 3GPP TS 38.101-1 v16.4.0, (Jul. 2020), 408 pages.

(Continued)

*Primary Examiner* — Allahyar Kasraian
(74) *Attorney, Agent, or Firm* — ALSTON & BIRD LLP

(57) ABSTRACT

Circuitry comprising: a first radio path comprising a first filter configured for a first radio access technology (RAT) system; a second radio path comprising a second filter configured for a second radio access technology (RAT) system different to the first RAT system; means for obtaining a first indicator, dependent on the first RAT system, wherein the first indicator is one of a predetermined number of states; means for obtaining a second indicator, dependent on the second RAT system wherein the second indicator is one of a predetermined number of states; and means for using a combination of the states of the first indicator and the second indicator to control characteristics of at least the first filter.

16 Claims, 8 Drawing Sheets

(56) References Cited

U.S. PATENT DOCUMENTS

| | | | |
|---|---|---|---|
| 2014/0055210 | A1 | 2/2014 | Black et al. |
| 2014/0087785 | A1 | 3/2014 | Smadi et al. |
| 2015/0381291 | A1 | 12/2015 | Mahajan et al. |
| 2016/0182134 | A1* | 6/2016 | Kol ............... H04B 1/7107 370/329 |
| 2018/0007697 | A1 | 1/2018 | Tolochko et al. |
| 2018/0048345 | A1 | 2/2018 | Pehlke et al. |
| 2019/0181832 | A1 | 6/2019 | Schmalzl et al. |
| 2019/0334563 | A1 | 10/2019 | Elbrecht et al. |
| 2020/0067549 | A1 | 2/2020 | Raghavan |
| 2020/0153410 | A1 | 5/2020 | Nielsen et al. |

OTHER PUBLICATIONS

"Code of Federal Regulations (annual edition), Title 45: Telecommunication. Subpart E: Unlicensed National Information Infrastructure Devices", 47 CFR § 15.407, General Technical Requirements, (Jan. 16, 2020), pp. 923-926.

"IEEE Standard for Information technology; Telecommunications and information exchange between systems; Local and metropolitan area networks; Specific requirements; Part 11: Wireless LAN Medium Access Control (MAC) and Physical Layer (PHY) Specifications; Amendment 4: Enhancements for Very High Throughput for Operation in Bands below 6 GHz", IEEE 802.11ac-2013, (Dec. 18, 2013), 425 pages.

"Innovative BAW Filters for 5G", Qorvo Design Hub Brochure, (Feb. 3, 2020), 2 pages.

Balteanu et al., "5G RF Front End Module Architectures for Mobile Applications", Proceedings of the 49th European Microwave Conference, (Oct. 1-3, 2019), 4 pages.

Heinrichs et al., "Component Linearity and Power Efficiency: A Sub-Six 5G Flexible Low-Interference Receiver", IEEE Microwave Magazine, vol. 21, Issue 4, (Mar. 2, 2020), 6 pages.

Office Action and Search Report for Finland Application No. 20205934 dated Jan. 8, 2021, 10 pages.

Skyworks, "5 GHz Wi-Fi Coexistence with 5G Cellular for Improved User Experience", Technical Article, [Retrieved on Dec. 9, 2021] Retrieved via the Internet: <URL: https://www.skyworksinc.com/-/media/SkyWorks/Documents/Articles/Wi-Fi-Coexistence.pdf>., (Mar. 5, 2020), 4 pages.

Extended European Search Report for European Application No. 21198554.4 dated Feb. 17, 2022, 10 pages.

Office Action for Chinese Application No. 202111144080.4 dated Jan. 30, 2024, 15 pages.

Office Action for European Application No. 21198554.4 dated Nov. 23, 2023, 7 pages.

Office Action for Chinese Application No. 202111144080.4 dated Oct. 17, 2024, 13 pages.

* cited by examiner (a)

(b)

(c)

(d)

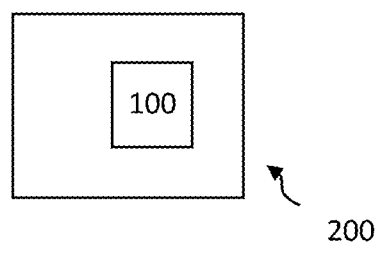
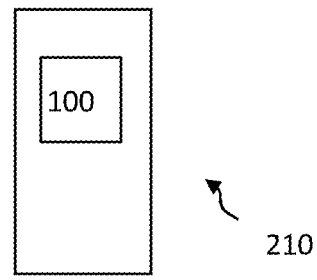
FIG 10  FIG 11
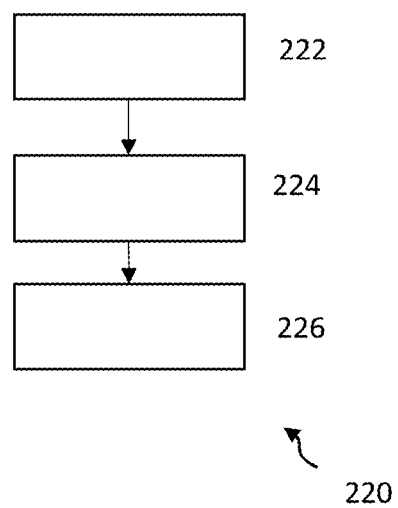
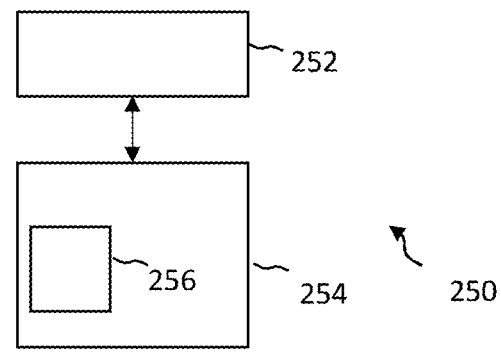
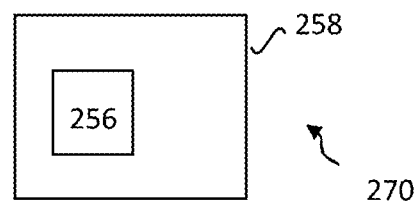
FIG 12
FIG 13
FIG 14

FILTRATION FOR RADIO ACCESS TECHNOLOGIES

CROSS-REFERENCE TO RELATED APPLICATIONS

This application claims priority to Finnish Application No. 20205934, filed Sep. 28, 2020, the entire contents of which are incorporated herein by reference.

TECHNOLOGICAL FIELD

Embodiments of the present disclosure relate to radio communications and, in particular, filtration for Radio Access Technologies.

BACKGROUND

Radio communications occur using different radio access technologies. A single radio access technology (RAT) can use one or more frequency bands for transmitting/receiving radio signals. Different RATs can use the same or different frequency bands for transmitting/receiving radio signals.

It can be desirable to filter a transmitted or received signal so that it is limited or more limited to a specific frequency range or frequency ranges. This allows the signal to noise ratio of the analogue radio signal to be improved.

The environment in which radio communication occurs changes. What is communicated where can also change. It would be desirable to provide circuitry to control characteristics of a filter configured for a radio access technology.

BRIEF SUMMARY

According to various, but not necessarily all, embodiments there is provided circuitry comprising:
a first radio path comprising a first filter configured for a first radio access technology (RAT) system;
means for obtaining a first indicator, dependent on the first RAT system, wherein the first indicator is one of a predetermined number of states;
means for obtaining a second indicator, dependent on a second RAT system, different to the first RAT system, wherein the second indicator is one of a predetermined number of states; and
means for using a combination of the states of the first indicator and the second indicator to control characteristics of at least the first filter.

In some but not necessarily all examples, the circuitry comprises means for using a combination of the states of the first indicator and the second indicator to control filtration by the first filter.

In some but not necessarily all examples, the first indicator is indicative of a quality of communication using the first RAT system.

In some but not necessarily all examples, the second indicator is indicative of an impact of interference between the first RAT system and the second RAT system.

In some but not necessarily all examples, the circuitry comprises means for conditionally configuring the first filter for applying filtration
when:
the first indicator is indicative of a good quality of communication using the first RAT system; and
the second indicator is indicative of an impact of interference between the first RAT system and the second RAT system.

In some but not necessarily all examples, the circuitry comprises means for conditionally configuring the first filter for applying filtration
when:
the first indicator is indicative of a good quality of communication using the first RAT system; and
the second indicator is indicative of satisfaction of a condition dependent upon the second RAT system.

In some but not necessarily all examples, the first radio path is being used for transmission, the condition dependent upon the second RAT system is satisfied when reception in the second RAT system is bad.

In some but not necessarily all examples, the first radio path is being used for reception,
the condition dependent upon the second RAT system is satisfied when transmission in the second RAT system is present at interference levels.

In some but not necessarily all examples, the controlling the first filter comprises: adding, removing and/or adjusting a component of the first filter.

In some but not necessarily all examples, the first RAT system is one of a 3GPP network and a WiFi network and wherein the second RAT system is the other one of a 3GPP network and a WiFi network.

In some but not necessarily all examples, the circuitry comprises a second radio path comprising a second filter configured for a second radio access technology (RAT) system different to the first RAT system; and
means for controlling:
a) the first filter to filter transmission in the first path to reduce interference to the second RAT, when there is good reception in the first RAT and bad reception in the second RAT;
b) the first filter to filter reception in the first path to reduce interference from the second RAT when there is good reception in the first RAT and transmission is present from the second RAT at interference levels;
c) the second filter to filter transmission in the second path to reduce interference to the first RAT when there is good reception in the second RAT and bad reception in the first RAT; and
d) the second filter to filter reception in the second path to reduce interference from the first RAT when there is good reception in the second RAT and transmission is present from the first RAT at interference levels.

In some but not necessarily all examples, the first filter is controlled differently to filter transmission in the first path to reduce interference to the second RAT and to filter reception in the first path to reduce interference from the second RAT; and/or wherein the second filter is controlled differently to filter transmission in the second path to reduce interference to the first RAT and to filter reception in the second path to reduce interference from the first RAT.

According to various, but not necessarily all, embodiments there is provided a chipset for radio communications comprising the circuitry.

According to various, but not necessarily all, embodiments there is provided a user equipment for radio communications comprising the circuitry or the chipset.

According to various, but not necessarily all, embodiments there is provided a method comprising:
obtaining a first indicator, dependent on a first radio access technology (RAT) system, wherein the first indicator is one of a predetermined number of states;
obtaining a second indicator, dependent on a second RAT system wherein the second indicator is one of a predetermined number of states; and using a combination of the states of the first indicator and the second indicator to control at least characteristics of filtration for the first RAT system.

According to various, but not necessarily all, embodiments there is provided a computer program that, when run on a computer, performs:

processing a combination of the states of a first indicator and a second indicator to control at least characteristics of filtration for the first RAT system, wherein the first indicator is dependent on a first radio access technology (RAT) system and is one of a predetermined number of states; and the second indicator is dependent on a second RAT system and is one of a predetermined number of states.

According to various, but not necessarily all, embodiments there is provided circuitry comprising:

a first radio path comprising a first filter configured for a first radio access technology (RAT) system;

a second radio path comprising a second filter configured for a second radio access technology (RAT) system different to the first RAT system;

means for controlling the first filter to filter transmission in the first path to reduce interference to the second RAT, when there is good reception in the first RAT and bad reception in the second RAT; and/or the first filter to filter reception in the first path to reduce interference from the second RAT when there is good reception in the first RAT and transmission is present from the second RAT present at interference levels.

According to various, but not necessarily all, embodiments there is provided circuitry comprising:

a first radio path comprising a first filter configured for a first radio access technology (RAT) system;

a second radio path comprising a second filter configured for a second radio access technology (RAT) system different to the first RAT system;

means for augmenting filtration by the first filter to filter transmission in the first path to reduce interference to the second RAT, when there is good reception in the first RAT and bad reception in the second RAT; and/or augmenting filtration by the first filter to filter reception in the first path to reduce interference from the second RAT when there is good reception in the first RAT and transmission is present from the second RAT present at interference levels.

According to various, but not necessarily all, embodiments there is provided circuitry comprising:

a first radio path comprising a first filter configured for a first radio access technology (RAT) system;

a second radio path comprising a second filter configured for a second radio access technology (RAT) system different to the first RAT system;

means for controlling a) the first filter to filter transmission in the first path to reduce interference to the second RAT, when there is good reception in the first RAT and bad reception in the second RAT;

b) the first filter to filter reception in the first path to reduce interference from the second RAT when there is good reception in the first RAT and transmission is present from the second RAT present at interference levels;

c) the second filter to filter transmission in the second path to reduce interference to the first RAT when there is good reception in the second RAT and bad reception in the first RAT; and d) the second filter to filter reception in the second path to reduce interference from the first RAT when there is good reception in the second RAT and transmission is present from the first RAT present at interference levels.

According to various, but not necessarily all, embodiments there is provided circuitry comprising:

a first radio path comprising a first filter configured for a first radio access technology (RAT) system;

a second radio path comprising a second filter configured for a second radio access technology (RAT) system different to the first RAT system;

a) means for augmenting filtration by the first filter to filter transmission in the first path to reduce interference to the second RAT, when there is good reception in the first RAT and bad reception in the second RAT;

b) means for augmenting filtration by the first filter to filter reception in the first path to reduce interference from the second RAT when there is good reception in the first RAT and transmission is present from the second RAT present at interference levels;

c) means for augmenting filtration by the second filter to filter transmission in the second path to reduce interference to the first RAT when there is good reception in the second RAT and bad reception in the first RAT; and d) means for augmenting filtration by the second filter to filter reception in the second path to reduce interference from the first RAT when there is good reception in the second RAT and transmission is present from the first RAT present at interference levels.

According to various, but not necessarily all, embodiments there is provided examples as claimed in the appended claims.

BRIEF DESCRIPTION

Some examples will now be described with reference to the accompanying drawings in which:

FIG. 10 shows another example of the subject matter described herein;

FIG. 11 shows another example of the subject matter described herein;

FIG. 12 shows another example of the subject matter described herein;

FIG. 13 shows another example of the subject matter described herein; and

FIG. 14 shows another example of the subject matter described herein.

DETAILED DESCRIPTION

Figure 1:
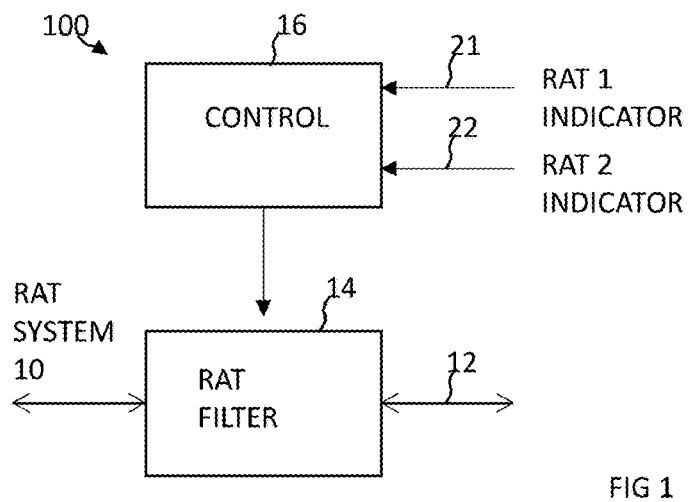
FIG. 1 shows an example of the subject matter described herein.

The drawings illustrate, and the following description describes, various examples of circuitry 100 comprising a first radio path 12 comprising a first filter 14 configured for a first radio access technology (RAT) system 10;

means for obtaining a first indicator 21, dependent on the first RAT system 10, wherein the first indicator 21 is one of a predetermined number of states;

means for obtaining a second indicator 22, dependent on a second RAT system different to the first RAT system, wherein the second indicator 22 is one of a predetermined number of states; and means 16 for using a combination of the states of the first indicator 21 and the second indicator 22 to control characteristics of at least the first filter 14.

Figure 2:
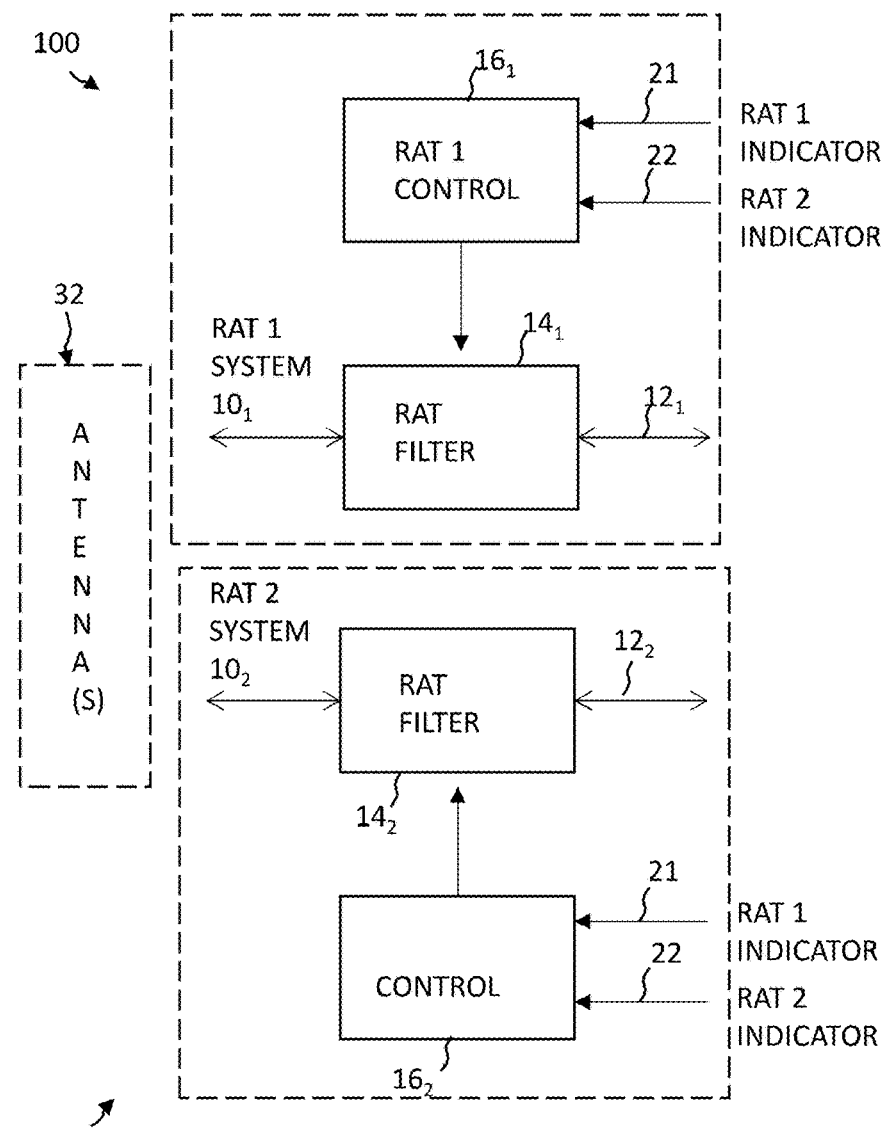
FIG. 2 shows another example of the subject matter described herein.

FIG. 1 illustrates an example of circuitry 100 for a single radio access technology system 10. The circuitry 100 can, in some examples, be used for more than one radio access technology or more than one frequency band. FIG. 2 illustrates an example, of circuitry 100 that can be used for multiple radio access technologies. There are two radio access technology systems $10_1$, $10_2$. In this example, but not necessarily all examples the RAT systems $10_1$, $10_2$ share a common front end 30 that is coupled to one or more shared antennas 32.

The circuitry 100 comprises:

a first radio path $12_1$ comprising a first filter $14_1$ configured for a first radio access technology (RAT) system $10_1$;

a second radio path $12_2$ comprising a second filter $14_2$ configured for a second radio access technology (RAT) system $10_2$ different to the first RAT system $10_1$;

means for obtaining a first indicator 21, dependent on the first RAT system $10_1$, wherein the first indicator 21 is one of a predetermined number of states;

means for obtaining a second indicator 22, dependent on the second RAT system $10_2$, wherein the second indicator 22 is one of a predetermined number of states; and means $16_1$ for using a combination of the states of the first indicator 21 and the second indicator 22 to control characteristics of at least the first filter $14_1$; and means $16_2$ for using a combination of the states of the first indicator 21 and the second indicator 22 to control characteristics of at least the second filter $14_2$.

In the examples of FIGS. 1 and 2, the first indicator 21 is a result of a quantisation process that quantises a value dependent upon the first RAT system $10_1$. The first indicator 21 is not necessarily Boolean. The quantisation is not necessarily fixed e.g. thresholds used for quantisation can be fixed or variable. In some examples a threshold or thresholds can be history dependent. For example, the variability could depend upon history e.g. hysteresis. The value can be the result of a calculation, a measurement or another parameter.

The second indicator 22 is a result of quantisation process that quantises a value dependent upon the second RAT system $10_2$. The second indicator 22 is not necessarily Boolean. The quantisation is not necessarily fixed e.g. thresholds used for quantisation can be fixed or variable. In some examples a threshold or thresholds can be history dependent. For example, the variability could depend upon history e.g. hysteresis. The value can be the result of a calculation, a measurement or another parameter.

The means $16_1$ for using a combination of the states of the first indicator 21 and the second indicator 22 to control characteristics of the first filter $14_1$ can for example use digital processing or logic to control the first filter $14_1$.

The means $16_2$ for using a combination of the states of the first indicator 21 and the second indicator 22 to control characteristics of the second filter $14_2$ can for example use digital processing or logic to control the second filter $14_2$.

A combination of the states of the first indicator 21 and the second indicator 22 control characteristics of the first filter $14_1$.

A combination of the states of the first indicator 21 and the second indicator 22 control characteristics of the second filter $14_2$.

The first indicator 21 can be indicative of a quality of communication using the first RAT system $10_1$. In some examples, the first indicator 21 can be indicative of a quality of reception at the first RAT system $10_1$. In this example, the first indicator 21 can be a level of reception, and that level of reception can depend on a reception measurement.

Suitable quality metrics that can be used as or to create the first indicator 21 include any one or more of Reference Signal Received Power (RSRP), Reference Signal Received Quality (RSRQ), Reference Signal Strength Indication (RSSI), and/or a Channel Quality Indicator (CQI).

The first indicator 21 can be quantised so that it is a digital indicator.

The second indicator 22 is indicative of satisfaction of a condition dependent upon the second RAT system $10_2$. The condition can, for example, vary in dependence upon whether the first filter $14_1$ is being used for transmission or for reception.

In at least some examples, the second indicator 22 is indicative of an impact of interference between the first RAT system $10_1$ and the second RAT system $10_2$. When the first filter $14_1$ is being used for transmission (TX), the second indicator 22 can indicate a measured level of reception (RX) at the second RAT $10_2$. When the first filter $14_1$ is being used for reception, the second indicator 22 can indicate a measured level or presence of transmission from the second RAT $10_2$.

Where the second RAT $10_2$ is a cellular system e.g. 5G New Radio (NR), a measured level of reception at the second RAT $10_2$ can, for example, be inferred from a level of transmission at the second RAT $10_2$ which depends on a measured level of reception e.g. via power control.

Different examples a), b), c), d) will now be described:

a) augments the filtering of transmission (TX) by the first RAT system $10_1$ b) augments the filtering of reception (RX) by the first RAT system $10_1$ c) augments the filtering of transmission (TX) by the second RAT system $10_2$ d) augments the filtering of reception (RX) by the second RAT system $10_2$.

a) Filtering at transmission (TX), limits what is transmitted. In at least some examples, the circuitry 100 augments the filtering of transmission (TX) by the first RAT system $10_1$ when there is interference from the first RAT system $10_1$ to the second RAT system $10_2$ and filtering of transmission (TX) by the first RAT system $10_1$ will not have a negative impact on the first RAT system $10_1$.

The associated combination of the states of the first indicator 21 and the second indicator 22 to enable control of the characteristics of the first filter $14_1$ in this way are defined by condition:
  i) first indicator 21 indicates that reception in the first RAT $10_1$ is GOOD (and consequently filtering of transmission (TX) by the first RAT system $10_1$ will not have a negative impact on the first RAT system $10_1$)
  AND
  ii) second indicator 22 indicates that reception in the second RAT system $10_2$ is BAD (there is interference from the first RAT system $10_1$ to the second RAT system $10_2$).

When the condition is satisfied, the first filter $14_1$ is controlled to filter transmission in the first path to reduce interference to the second RAT system $10_2$ from the first RAT system $10_1$. This improves reception at the second RAT system $10_2$.

This corresponds to the examples, described later with respect to FIG. 6A, FIG. 8 (part (a)) and Table 1 (Row 4).

b) Filtering at reception (RX), limits what is received and processed. In at least some examples, the circuitry 100 augments the filtering of reception (RX) by the first RAT system $10_1$ when there is interference from the second RAT system $10_2$ to the first RAT system $10_1$ and filtering of reception (RX) by the first RAT system $10_1$ (to reduce the transmissions from the second RAT system $10_2$) will not have a negative impact on the first RAT system $10_1$.

The associated combination of the states of the first indicator 21 and the second indicator 22 to enable control of the characteristics of the first filter $14_1$ in this way are defined by condition:
  i) first indicator 21 indicates that reception in the first RAT $10_1$ is GOOD (and consequently filtering of reception (RX) by the first RAT system $10_1$ will not have a negative impact on the first RAT system $10_1$)
  AND
  ii) second indicator 22 indicates that transmission in the second RAT system $10_2$ is PRESENT (there is interference from the second RAT system $10_2$ to the first RAT system $10_1$ because transmission is present from the second RAT system $10_2$ at interference levels).

When the condition is satisfied, the first filter $14_1$ is controlled to filter reception in the first path to reduce interference from the second RAT system $10_2$ to the first RAT system $10_1$. This improves reception at the first RAT system $10_1$.

This corresponds to the example, described later with respect to FIG. 6B, FIG. 8 (part (b)) and Table 1 (Row 5).

In both examples (TX and RX), the associated combination of the states of the first indicator 21 and the second indicator 22 to enable control of the characteristics of the first filter $14_1$ requires that first indicator 21 is indicative of a good quality of communication using the first RAT system $10_1$ and the second indicator 22 is indicative of satisfaction of a condition dependent upon the second RAT system $10_2$. The condition is different depending on whether the filtration at the first filter $14_1$ will be for transmission or reception.

When the first radio path is being used for transmission, the condition dependent upon the second RAT system $10_2$ is satisfied when reception in the second RAT system $10_2$ is BAD.

When the first radio path is being used for reception, the condition dependent upon the second RAT system $10_2$ is satisfied when transmission in the second RAT system $10_2$ is present at interference levels.

c) In at least some examples, the circuitry 100 augments the filtering of transmission (TX) by the second RAT system $10_2$ when there is interference from the second RAT system $10_1$ to the first RAT system $10_1$ and filtering of transmission (TX) by the second RAT system $10_2$ will not have a negative impact on the second RAT system $10_2$.

The associated combination of the states of the first indicator 21 and the second indicator 22 to enable control of the characteristics of the second filter $14_2$ in this way are defined by condition:
  i) second indicator 22 indicates that reception in the second RAT $10_2$ is GOOD (and consequently filtering of transmission (TX) by the second RAT system $10_2$ will not have a negative impact on the second RAT system $10_2$)
  AND
  ii) first indicator 21 indicates that reception in the first RAT system $10_1$ is BAD (there is interference from the second RAT system $10_2$ to the first RAT system $10_1$).

When the condition is satisfied, the second filter $14_2$ is controlled to filter transmission in the second path to reduce interference to the first RAT system $10_1$ from the second RAT system $10_2$. This improves reception at the first RAT system $10_1$.

This corresponds to the example, described later with respect to FIG. 6C, FIG. 9 (part (c)) and Table 1 (Row 8).

d) In at least some examples, the circuitry 100 augments the filtering of reception (RX) by the second RAT system $10_2$ when there is interference from the first RAT system $10_1$ to the second RAT system $10_2$ and filtering of reception (RX) by the second RAT system $10_2$ (to reduce the transmissions from the first RAT system $10_1$) will not have a negative impact on the second RAT system $10_2$.

The associated combination of the states of the first indicator 21 and the second indicator 22 to enable control of the characteristics of the second filter $14_2$ in this way are defined by condition:
  i) second indicator 22 indicates that reception in the second RAT system $10_2$ is GOOD (and consequently filtering of reception (RX) by the second RAT system $10_2$ will not have a negative impact on the second RAT system $10_2$)
  AND
  ii) first indicator 21 indicates that transmission in the first RAT system $10_1$ is PRESENT (there is interference from the first RAT system $10_1$ to the second RAT system $10_2$ because transmission is present from the first RAT system $10_1$ at interference levels).

When the condition is satisfied, the second filter $14_2$ is controlled to filter reception in the second path to reduce interference from the first RAT system $10_1$ to the second RAT system $10_2$. This improves reception at the second RAT system $10_2$.

This corresponds to the example, described later with respect to FIG. 6D, FIG. 9 (part (d)) and Table 1 (Row 11).

In both examples (TX and RX), the associated combination of the states of the first indicator 21 and the second indicator 22 to enable control of the characteristics of the second filter $14_2$ requires that second indicator 22 is indicative of a good quality of communication using the second RAT system $10_2$ and the first indicator 21 is indicative of satisfaction of a condition dependent upon the first RAT system $10_1$. The condition is different depending on whether the filtration at the second filter $14_2$ will be for transmission or reception.

When the second radio path is being used for transmission, the condition dependent upon the first RAT system $10_1$ is satisfied when reception in the first RAT system $10_1$ is BAD.

When the second radio path is being used for reception, the condition dependent upon the first RAT system $10_1$ is satisfied when transmission in the first RAT system $10_1$ is present at interference levels.

In the above-described examples, a combination of the states of the first indicator 21 and the second indicator 22 is used to control filtration by the first filter $14_1$. When the first indicator 21 is indicative of a good quality of communication using the first RAT system $10_1$ and the second indicator 22 is indicative of an impact of interference between the first RAT system and the second RAT system, the first filter $14_1$ is configured for supplementary filtration.

Radio Access Technologies operate independently having protocol stacks that can be separate at layers 1 and 2, at least. They can use separate radio frequency front end filtering (layer 1).

Figure 3A:
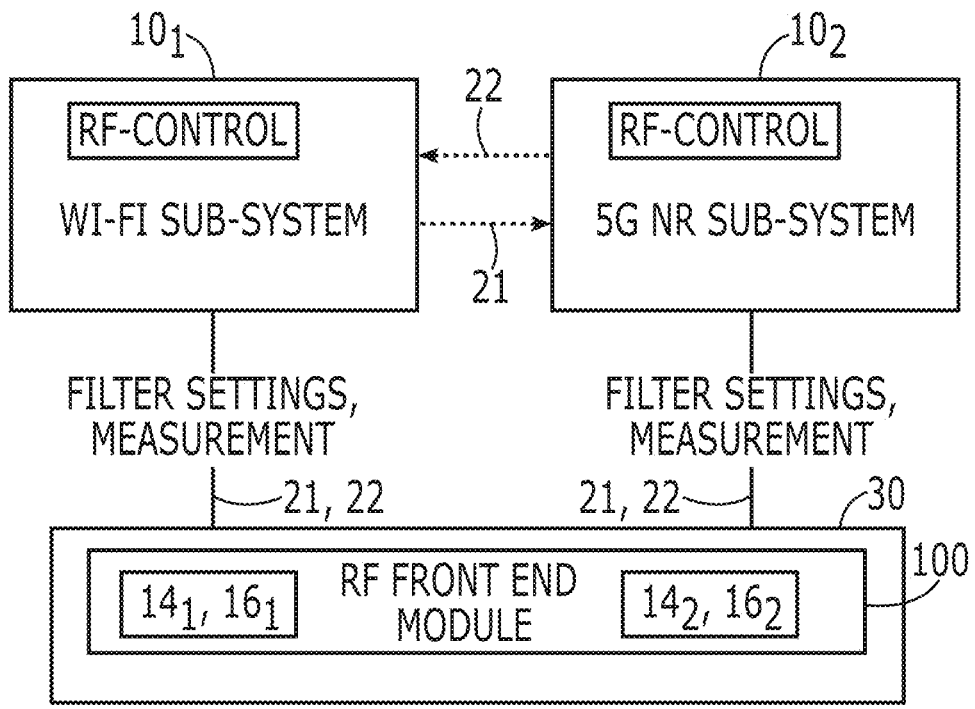
FIG. 3A shows another example of the subject matter described herein.

FIG. 3A illustrates an example in which the first RAT system $10_1$ and the second RAT system $10_2$ are independent at the control plane. In this example, the first RAT system $10_1$ and the second RAT system $10_2$ share a common radio frequency front end module 30 but do not share a common controller. The first RAT system $10_1$ and the second RAT system $10_2$ are, in this example, configured for duplex operation.

Typically, a front-end module comprises filters and switches that combine several bands and RATs to the same antenna. Sometimes it also includes the power amplifier.

In this example, but not necessarily all examples, the first RAT system $10_1$ comprises a WiFi sub-system and a portion of the front-end module 30, and the second RAT system $10_2$ comprises a 5G New Radio sub-system and a portion of the front-end module 30.

In this document reference to WiFi can refer to the standard IEEE 802.11 a/n/ac. In this document reference to 5G New Radio can refer to the 3GPP standard and, in particular frequency band n79. 5G NR band n79 is located at 4.4 GHz to 5 GHz, which is right next to the Wi-Fi 802.11 n (and above) band which is located at 5.15 GHz to 5.825 GHz. Channel 50 of U-NII-1 and U-NII-2A is centred at 5.25 GHz with a 160 MHz bandwidth.

In other examples, the first filter $14_1$ of the first RAT system $10_1$ and the second filter $14_2$ of the second RAT system $10_2$ have operational bandwidths above 1 GHz.

The front-end module 30, in this example, comprises the circuitry 100 including control means 16 and filter 14 for each of the two RATs. The interface between the WiFi sub system and the front-end module therefore provides both the first and second indicators 21, 22 to the circuitry 100. In this example, the first RAT system $10_1$ obtains the second indicator 22 from the second RAT system $10_2$, for example, from a power detector. The interface between the 5G NR sub system and the front-end module therefore provides both the first and second indicators 21, 22 to the circuitry 100. In this example, the second RAT system $10_2$ obtains the first indicator 21 from the first RAT system $10_2$, for example, from a power detector.

In other examples, the front-end module 30, can comprise the filter 14, but not the control means 16, for each of the two RATs. In this example, the WiFi sub system comprises the control means $16_1$ which obtains the second indicator 22 from the second RAT system $10_2$. The 5G NR sub system comprises the control means $16_2$ which obtains the first indicator 21 from the first RAT system $10_1$.

Figure 3B:
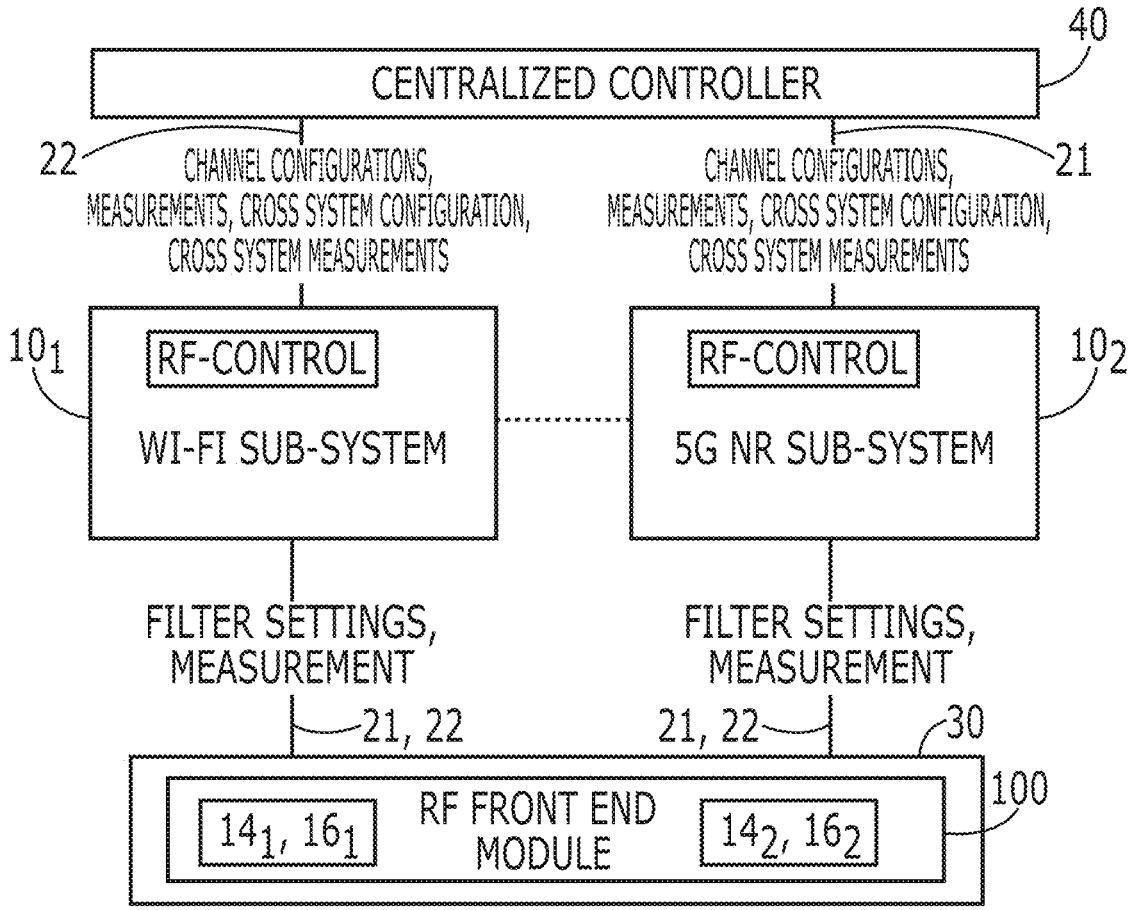
FIG. 3B shows another example of the subject matter described herein.

FIG. 3B illustrates an example in which the first RAT system $10_1$ and the second RAT system $10_2$ are not independent at the control plane. The first RAT system $10_1$ and the second RAT system $10_2$ share a common controller 40.

In this example, the first RAT system $10_1$ and the second RAT system $10_2$ share a common radio frequency front end module 30.

In this example, but not necessarily all examples, the first RAT system $10_1$ comprises a WiFi sub-system and a portion of the front-end module 30, and the second RAT system $10_2$ comprises a 5G New Radio sub-system and a portion of the front-end module 30.

The front-end module 30, in this example, comprises the circuitry 100 including control means 16 and filter 14 for each of the two RATs. The interface between the WiFi sub system and the front-end module therefore provides both the first and second indicators 21, 22 to the circuitry 100. In this example, the first RAT system $10_1$ obtains the second indicator 22 from the controller 40. The interface between the 5G NR sub system and the front-end module therefore provides both the first and second indicators 21, 22 to the circuitry 100. In this example, the second RAT system $10_2$ obtains the first indicator 21 from the controller 40.

In other examples, the front-end module 30, can comprise the filter 14, but not the control means 16, for each of the two RATs. In this example, the WiFi sub system comprises the control means $16_1$ which obtains the second indicator 22 from the controller 40. The 5G NR sub system comprises the control means $16_2$ which obtains the first indicator 21 from the controller 40.

Figure 4A:
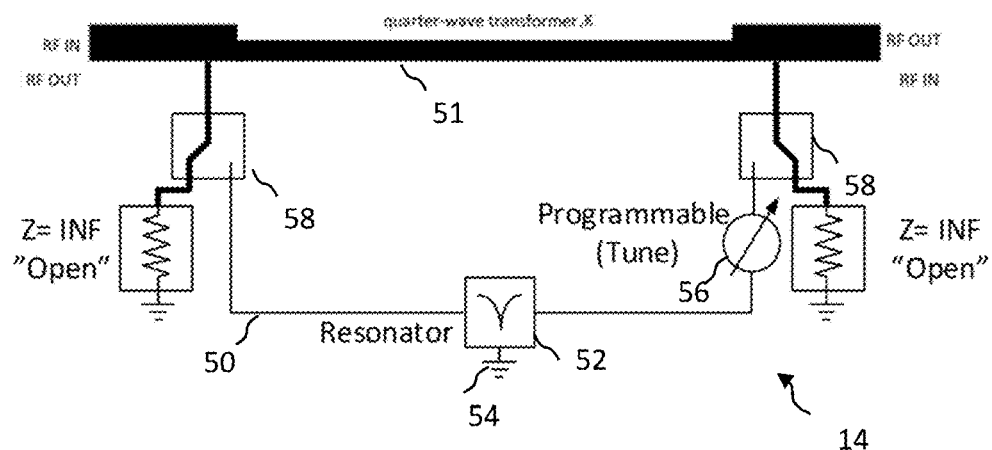
FIG. 4A shows another example of the subject matter described herein.
Figure 4B:
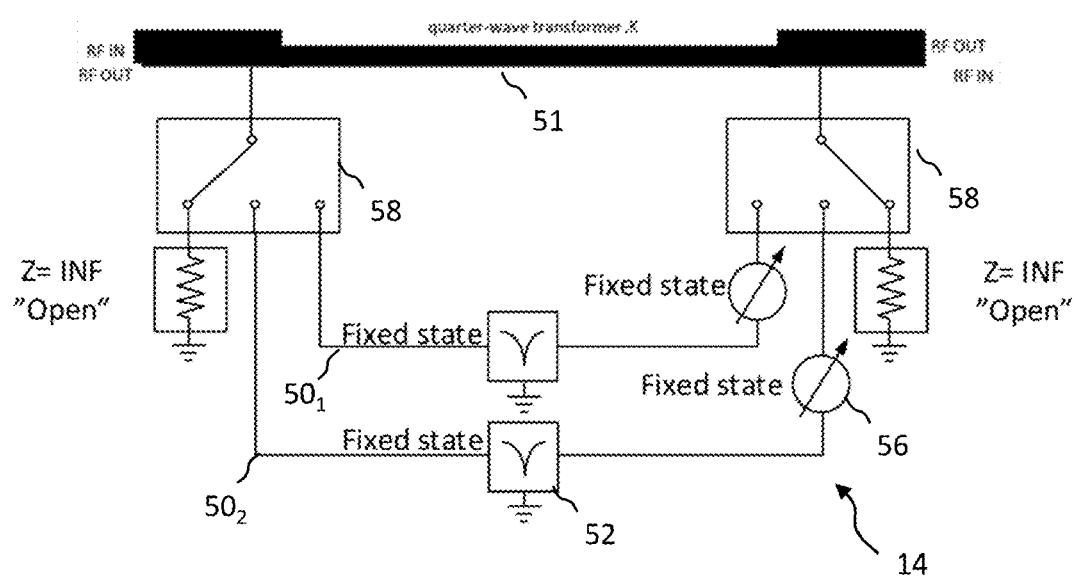
FIG. 4B shows another example of the subject matter described herein.

The controlling $16_1$, $16_2$ of characteristics of the filters $14_1$, $14_2$ using combinations of the states of the first indicator 21 and the second indicator 22 can comprise adding, removing and/or adjusting a component of the filter $14_1$, $14_2$, for example as illustrated in FIGS. 4A and 4B.

FIG. 4A illustrates an example of a filter 14 that is configurable to have different complex impedance.

The filter 14 comprises a parallel path 50 comprising, in series, a shunt resonator 52 to ground 54 and a phase element 56 for introducing a phase delay/advance.

The parallel path 50 can be selectively connected and disconnected to end nodes of an internode connection 51 by switches 58.

The impedance characteristics of the filter 14 are controlled by switches 58 which either connect or disconnect the parallel path 50.

The impedance characteristics of the filter 14 is also controlled by the characteristics of the shunt resonator 52 and also by the phase delay/advance introduced by the phase delay element 56. In this example, the characteristics of the shunt resonator 52 are fixed but the phase element 56 is programmable.

In this example, but not necessarily all examples, the shunt resonator 52 is a single zero filter and changing the phase of the phase element 56 controls the position of the zero in frequency. This is illustrated in FIGS. 6A, 6B, 6C, 6D.

In other examples the shunt resonator 52 can be a multiple zero filter.

FIG. 4B illustrates a filter 14 similar to that illustrated in FIG. 4A. However, in this example, there are multiple parallel paths 50 and each path has a phase element 56 with a different fixed or variable phase. The parallel paths 50 can be selectively connected and disconnected to end nodes of an internode connection 51 by switches 58. The programming of the filter 14 in this example is therefore achieved by selectively connecting/disconnecting parallel paths $50_1$, $50_2$.

Figure 5:
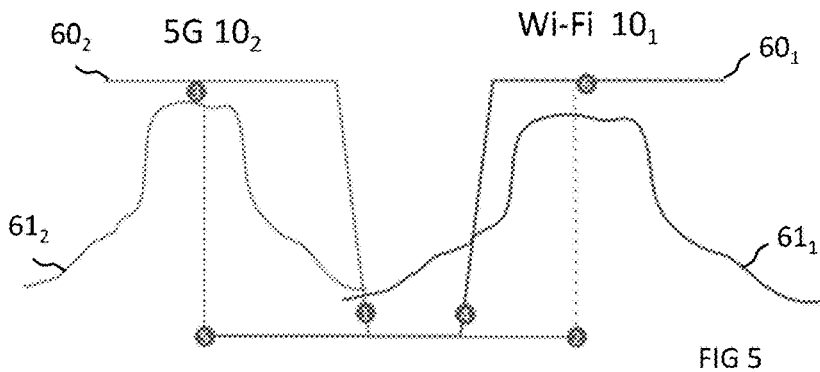
FIG. 5 shows another example of the subject matter described herein.

FIG. 5 illustrates an ideal non-augmented filter response $60_1$ of the first filter $14_1$ and an actual non-augmented filter response $61_1$ of the first filter $14_1$. The filter responses illustrate the transmission coefficient S21. One or both of the filter responses $60_1$, $61_1$ can be band-pass responses that should have high transmission for frequencies in a first band corresponding to the operational frequency band of the first RAT system $10_1$ and low transmission for frequencies outside (e.g. below) the first band. One or both of the filter responses $60_1$, $61_1$ can be high-pass responses that should have high transmission for frequencies in and above the first band.

The first filter $14_1$ is a passband filter for the first band comprising low in-(first) band attenuation and high out-of-(first) band attenuation. The controlling of the first filter $14_1$ comprises at least further increasing the out-of-band attenuation.

Portions of the non-augmented filter response $60_1$ are labelled [4], [5], [6].

At portion [4] of the non-augmented filter response $60_1$, the first RAT $10_1$ transmits with more power than 'ideal' out-of-band. The first RAT $10_1$ (WiFi) uses supplementary filtration at transmission, via the first filter $14_1$, to avoid interference to the second RAT $10_2$ (5G). An example of supplementary filtration $62_a$ is illustrated in FIG. 6A. This illustrates filtering of transmission (TX) by the first RAT system $10_1$ when there is interference from the first RAT system $10_1$ to the second RAT system $10_2$. In this example, the supplementary filtration 62a is predominantly outside the first band.

At portion [5] of the non-augmented filter response $60_1$, the second RAT $10_2$ (5G) transmits with more power than 'ideal'. The first RAT $10_1$ (WiFi) uses supplementary filtration at reception, via the first filter $14_1$, to avoid interference from the second RAT $10_2$ (5G). An example of supplementary filtration $62_b$ is illustrated in FIG. 6B. This illustrates filtering of reception (RX) by the first RAT system $10_1$ when there is interference from the second RAT system $10_2$ to the first RAT system $10_1$. In this example, the supplementary filtration $62_b$ is predominantly inside the second band.

At portion [6] of the non-augmented filter response $60_1$, the first RAT $10_1$ transmits with insertion loss. The first RAT $10_1$ (WiFi) does not use supplementary filtration at transmission, via the first filter $14_1$.

FIG. 5 also illustrates an ideal non-augmented filter response $60_2$ of the second filter $14_2$ and an actual non-augmented filter response $61_2$ of the second filter $14_2$. The filter responses illustrate the transmission coefficient S21. One or both of the filter responses $60_2$, $61_2$ can be band-pass responses that should have high transmission for frequencies in a second band corresponding to the operational frequency band of the second RAT system $10_2$ and low transmission for frequencies outside (e.g. above) the second band. One or both of the filter responses $60_2$, $61_2$ can be low-pass responses that should have high transmission for frequencies in or below the second band.

The second filter $14_2$ is a passband filter for the second band comprising low in-band attenuation and high out-of-(second) band attenuation. The controlling of the second filter $14_2$ comprises at least further increasing the out-of-(second) band attenuation.

Portions of the non-augmented filter response $60_2$ are labelled [1], [2], [3].

At portion [1] of the non-augmented filter response $60_2$, the second RAT $10_2$ (5G) transmits with more power than 'ideal' out-of-band. The second RAT $10_2$ (5G) uses supplementary filtration at transmission, via the second filter $14_2$, to avoid interference to the first RAT $10_1$ (WiFi). An example of supplementary filtration $62_c$ is illustrated in FIG. 6C. This illustrates filtering of transmission (TX) by the second RAT system $10_2$ when there is interference from the second RAT system $10_2$ to the first RAT system $10_1$. In this example, the supplementary filtration $62_c$ is predominantly outside the second band.

At portion [2] of the non-augmented filter response $60_2$, the first RAT $10_1$ (WiFi) transmits with more power than 'ideal'. The second RAT $10_2$ (5G) uses supplementary filtration at reception, via the second filter $14_2$, to avoid interference from the first RAT $10_1$ (WiFi). An example of supplementary filtration $62_d$ is illustrated in FIG. 6D. This illustrates filtering of reception (RX) by the second RAT system $10_2$ when there is interference from the first RAT system $10_1$ to the second RAT system $10_2$. In this example, the supplementary filtration $62_d$ is predominantly inside the first band.

At portion [3] of the non-augmented filter response $60_2$, the second RAT $10_2$ transmits with insertion loss. The second RAT $10_2$ (5G) does not use supplementary filtration at transmission, via the second filter $14_2$.

The characteristics of the first filter $14_1$ and/or the second filter $14_2$ can therefore be controlled to reduce the interference at a RAT system 10 caused by transmission by another RAT system 10. FIGS. 6A and 6B illustrate augmenting the first filter $14_1$. FIGS. 6C and 6D illustrate augmenting the second filter $14_2$.

Figure 6A:
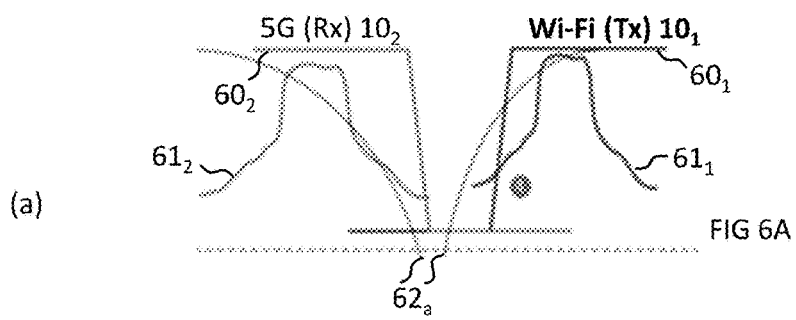
FIGS. 6A to 6D show other examples of the subject matter described herein.

In FIG. 6A the supplementary filtration $62_a$ (first path) targets out-of-band TX by the first RAT $10_1$. In FIG. 6B, the supplementary filtration $62_b$ (first path) targets in-band TX by the second RAT $10_2$.

Figure 6B:
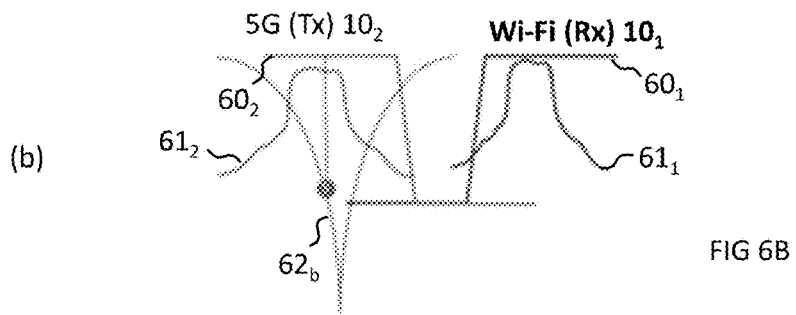
Figure 6C:
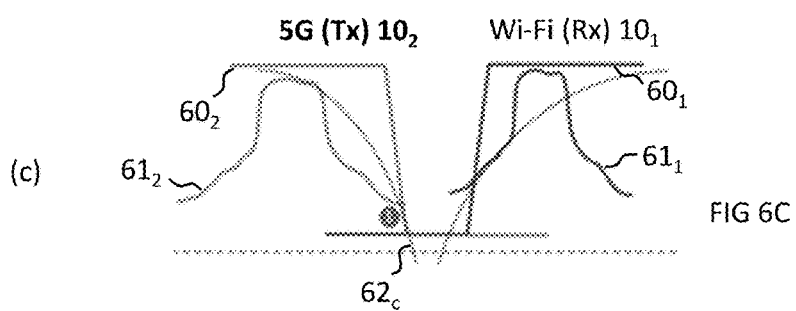

In FIG. 6C, the supplementary filtration $62_c$ (second path) targets out-of-band TX by the second RAT $10_2$. In FIG. 6D, the supplementary filtration $62_d$ (second path) targets in-band TX by first RAT $10_1$.

Figure 7:
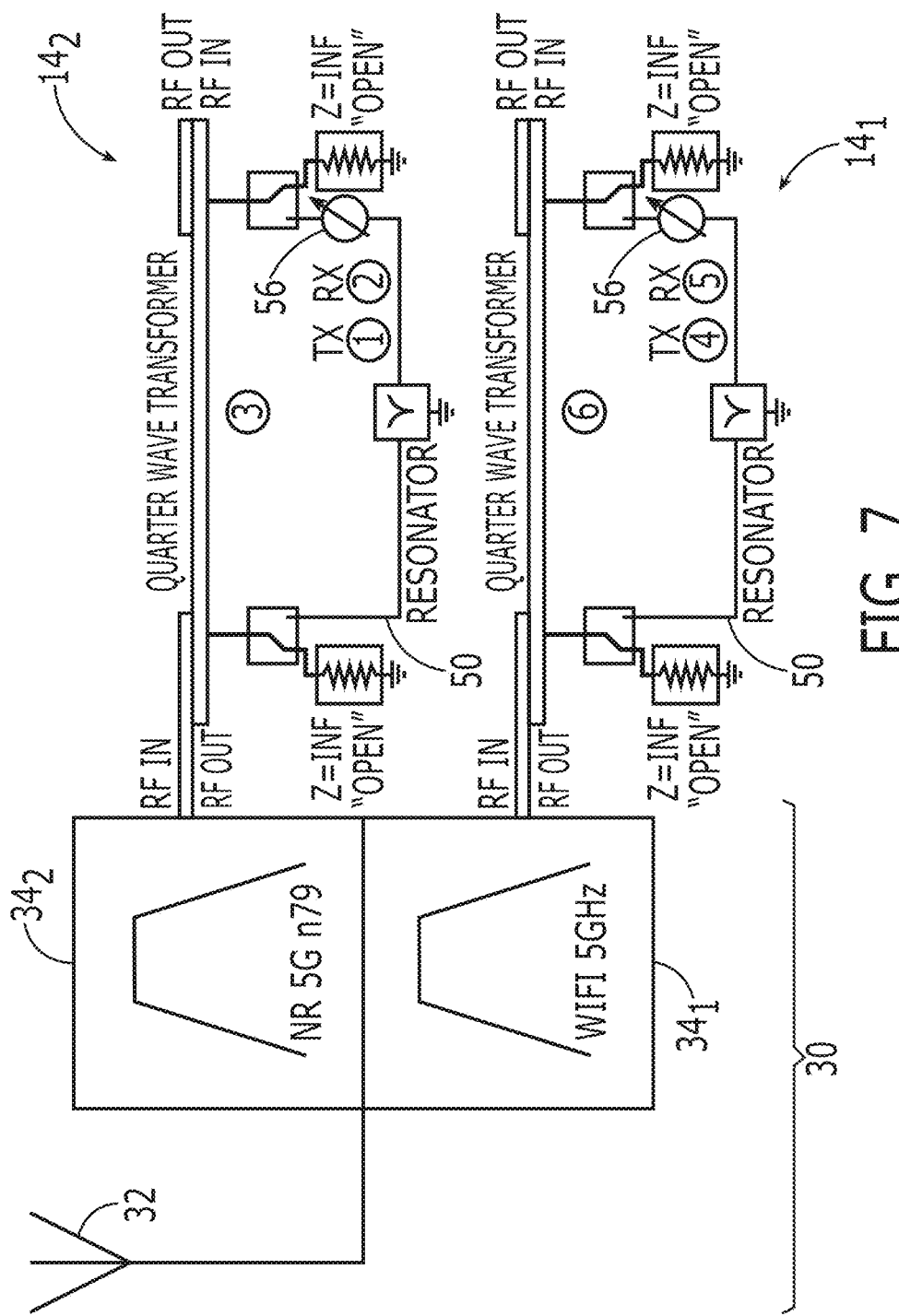
FIG. 7 shows another example of the subject matter described herein.

FIG. 7 illustrates a first filter $14_1$ that is configured to augment a filter $34_1$ for the first RAT system $10_1$ that is connected to an antenna 32 and a second filter $14_2$ that is configured to augment a filter $34_2$ for the second RAT system $10_2$ that is connected to the antenna 32.

In this example, the front end module 30 comprises filters $34_1$, $34_2$. In other examples, the front end module 30 comprises filters $34_1$, $34_2$ and filters $14_1$, $14_2$.

The first filter $14_1$ can operate as described with reference to FIG. 4A or FIG. 4B, for example. The example illustrated is in accordance with the example of FIG. 4A.

The second filter $14_2$ can operate as described with reference to FIG. 4A or FIG. 4B, for example. The example illustrated is in accordance with the example of FIG. 4A.

The first filter $14_1$ therefore has a non-augmented state [6] and two augmented states [4] and [5] which correspond respectively to FIGS. 6A and 6B. The states [4], [5], [6] correspond to portions [4], [5], [6] of the non-augmented filter response $60_1$ of the first filter $14_1$. The non-augmented state [6] corresponds to the filter $34_1$ The augmented state [4] corresponds to the filter $34_1$ augmented using the parallel path 50 with the phase element 56 set to a first value. The augmented state [5] corresponds to the filter $34_1$ augmented using the parallel path 50 with the phase element 56 set to a second value.

Figure 6D:
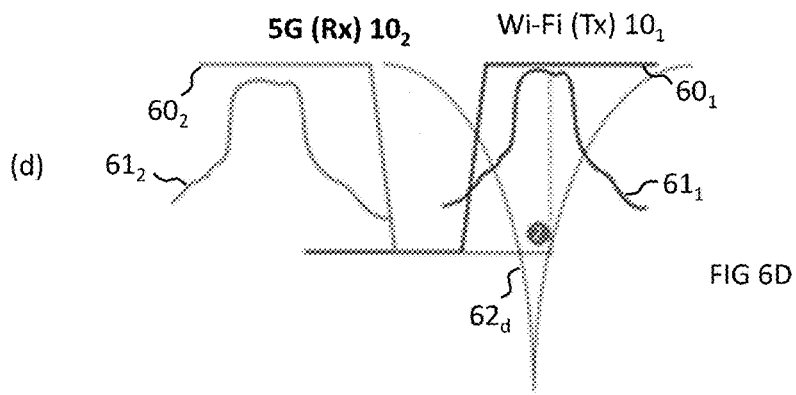

The second filter $14_2$ therefore has a non-augmented state [3] and two augmented states [1] and [2] which correspond respectively to FIGS. 6C and 6D. The states [1], [2], [3] correspond to portions [1], [2], [3] of the non-augmented filter response $60_2$ of the second filter $14_2$. The non-augmented state [3] corresponds to the filter $34_2$. The augmented state [1] corresponds to the filter $34_2$ augmented using the parallel path 50 with the phase element 56 set to a first value. The augmented state [2] corresponds to the filter $34_2$ augmented using the parallel path 50 with the phase element 56 set to a second value.

The circuitry 100 therefore provides means for controlling:

a) the first filter $14_1$ to filter transmission in the first path to reduce interference to the second RAT system $10_2$, when there is good reception in the first RAT system $10_1$ and bad reception in the second RAT system $10_2$ (FIG. 6A; state/portion [4]);

b) the first filter $14_1$ to filter reception in the first path to reduce interference from the second RAT system $10_2$ when there is good reception in the first RAT system $10_1$ and transmission is present from the second RAT system $10_2$ at interference levels (FIG. 6B; state/portion [5]);

c) the second filter $14_2$ to filter transmission in the second path to reduce interference to the first RAT system $10_1$ when there is good reception in the second RAT system $10_2$ and bad reception in the first RAT system $10_1$ (FIG. 6C; state/portion [1]); and d) the second filter $14_2$ to filter reception in the second path to reduce interference from the first RAT system $10_1$ when there is good reception in the second RAT system $10_2$ and transmission is present from the first RAT system $10_1$ at interference levels (FIG. 6D; state/portion [2]).

The first filter $14_1$ is controlled differently to filter transmission in the first path to reduce interference to the second RAT $10_2$ and to filter reception in the first path to reduce interference from the second RAT $10_2$.

The second filter $14_2$ is controlled differently to filter transmission in the second path to reduce interference to the first RAT $10_1$ and to filter reception in the second path to reduce interference from the first RAT $10_1$.

Figure 8:
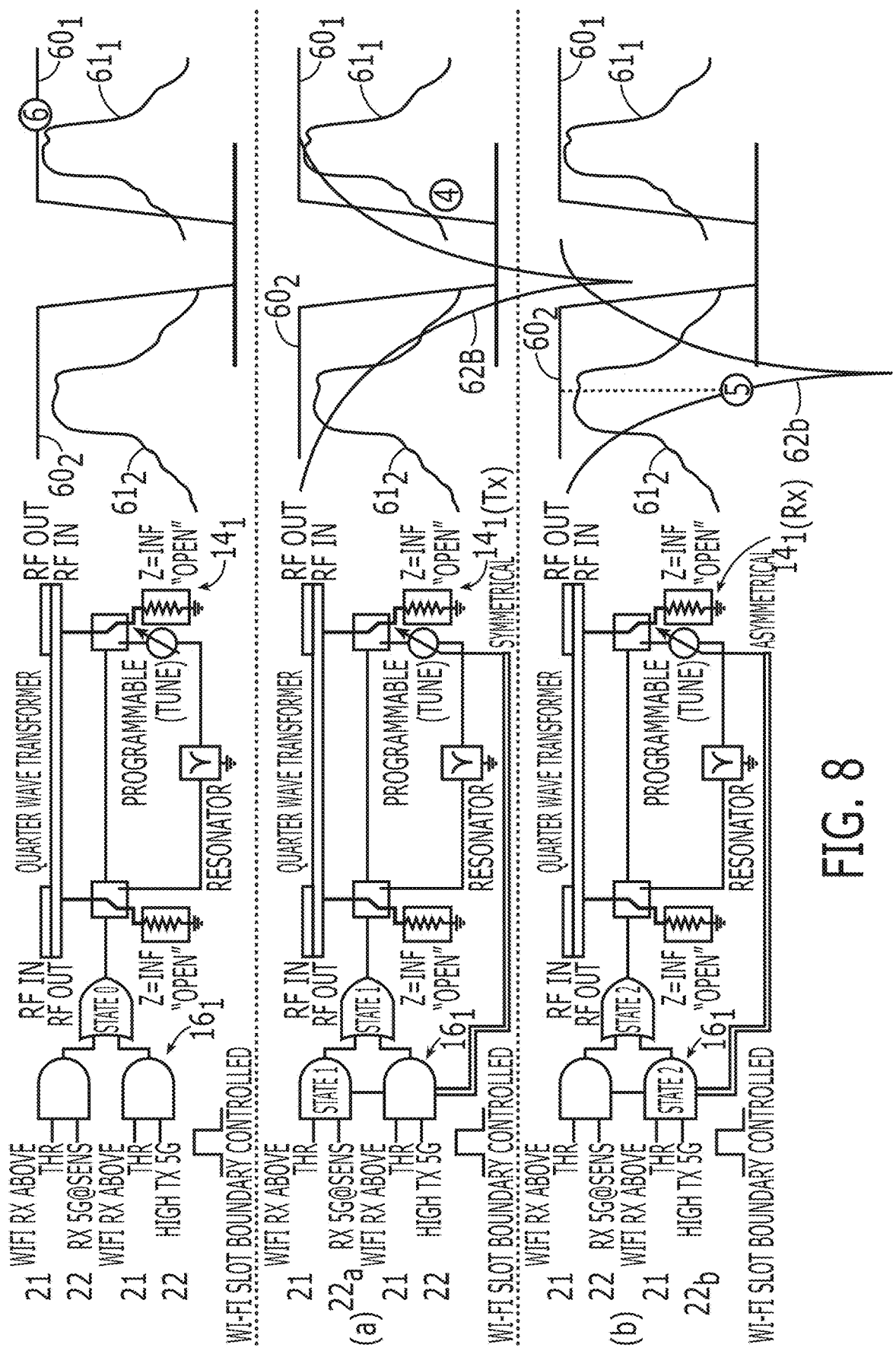
FIG. 8 shows another example of the subject matter described herein.

FIG. 8 illustrates that the states of the first filter $14_1$ can be controlled by combinations of different states of the first indicator 21 and second indicator 22 using logic. In this example, the states of the first indicator 21 and second indicator 22 are binary.

The FIG illustrates in order the non-augmented state [6], the augmented state [4] and the augmented state [5] as previously described.

In the portion of FIG. 8 labelled (a), the first filter $14_1$ is controlled to filter transmission in the first path to reduce interference to the second RAT system $10_2$, when there is good reception in the first RAT system $10_1$ and bad reception in the second RAT system $10_2$ (FIG. 6A; state/portion [4]).

In the portion of FIG. 8 labelled (b), the first filter $14_1$ is controlled to filter reception in the first path to reduce interference from the second RAT system $10_2$ when there is good reception in the first RAT system $10_1$ and transmission is present from the second RAT system $10_2$ at interference levels (FIG. 6B; state/portion [5]).

Figure 9:
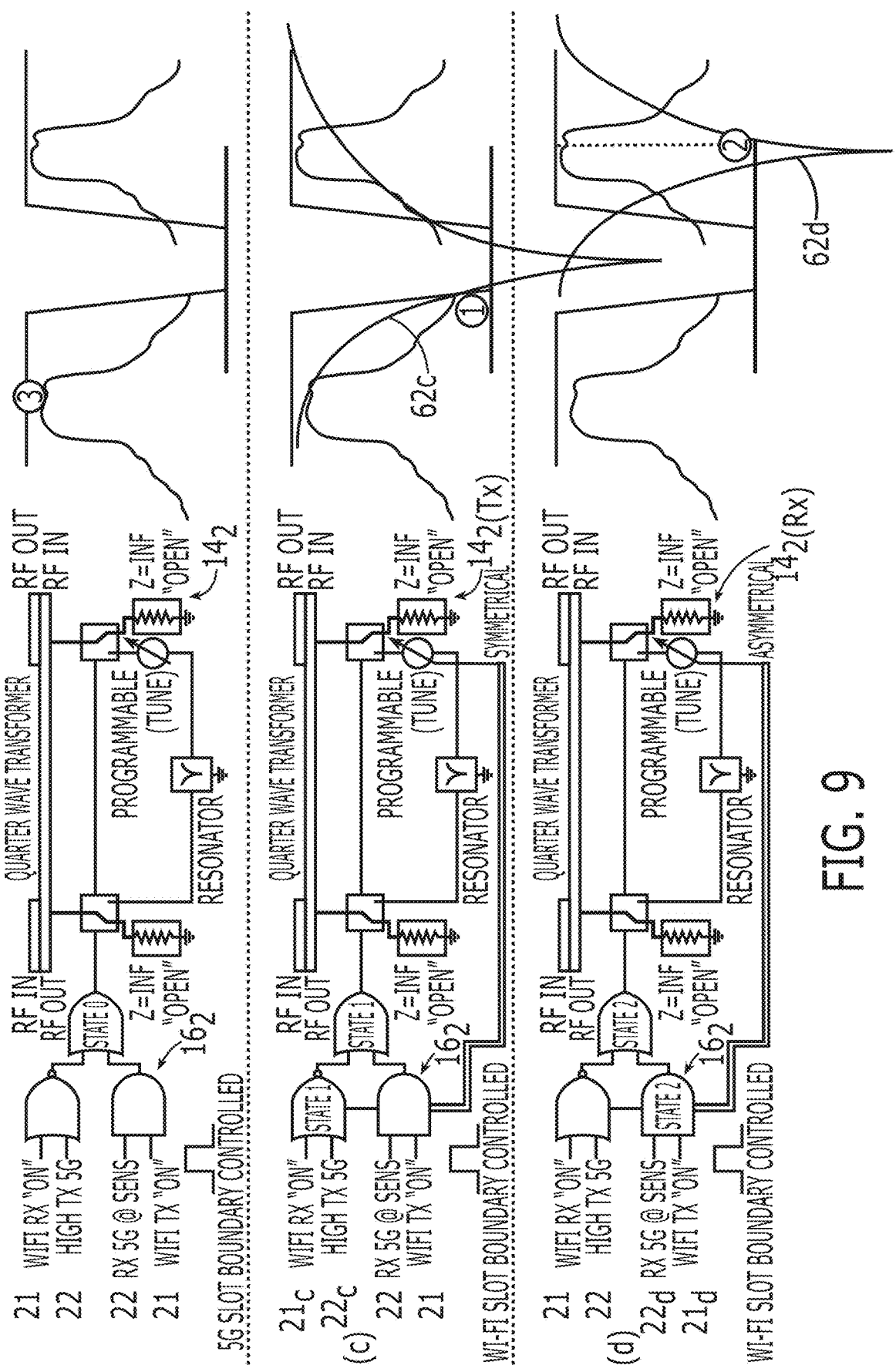
FIG. 9 shows another example of the subject matter described herein.

FIG. 9 illustrates that the states of the second filter $14_2$ can be controlled by combinations of different states of the first indicator 21 and second indicator 22 using logic. In this example, the states of the first indicator 21 and second indicator 22 are binary.

The FIG illustrates in order the non-augmented state [3], the augmented state [1] and the augmented state [2] as previously described.

In the portion of FIG. 9 labelled (c), the second filter $14_2$ is controlled to filter transmission in the second path to reduce interference to the first RAT system $10_1$ when there is good reception in the second RAT system $10_2$ and bad reception in the first RAT system $10_1$ (FIG. 6C; state/portion [1]).

In the portion of FIG. 9 labelled (d), the second filter $14_2$ is controlled to filter reception in the second path to reduce interference from the first RAT system $10_1$ when there is good reception in the second RAT system $10_2$ and transmission is present from the first RAT system $10_1$ at interference levels (FIG. 6D; state/portion [2]).

In the following, Boolean logic circuitry $16_1$, $16_2$ is used to convert an input combination of the states of the first indicator and the second indicator to an output indicator for controlling the filter $14_1$, $14_2$.

TABLE 1

|  | Col 1 Priority | Col 2 RX level WiFi | Col 3 RX level 5G | Col 4 TX WiFi | Col 5 TX level 5G | Col 6 WiFi filter mode | Col 7 5G filter mode | Col 8 Portion/ state | Col 9 FIG. 8/9 |
|---|---|---|---|---|---|---|---|---|---|
| Row 1 | WiFi | Low | Don't care | Don't care | Don't care | Off | Off | [6] |  |
| Row 2 | WiFi | High | High | Off | Don't care | Off | Off | [6] |  |
| Row 3 | WiFi | High | High | On | Don't care | Off | RX filtering | Cross system support ([1]) | (a) |
| Row 4 | WiFi | High | Low | Don't care | Don't care | TX filtering | Off | [4] | (b) |
| Row 5 | WiFi | High | Don't care | Don't care | High | RX filtering | Off | [5] |  |
| Row 6 | 5G | Don't care | Low | Don't care | Don't care | Off | Off | [3] |  |
| Row 7 | 5G | High | High | Don't care | Low | Off | Off | [3] | (c) |
| Row 8 | 5G | Low | High | Don't care | Low | Off | TX filtering | [2] |  |
| Row 9 | 5G | Don't care | High | Don't care | High | Off | Off | [3] |  |

TABLE 1-continued

| | Col 1 Priority | Col 2 RX level WiFi | Col 3 RX level 5G | Col 4 TX WiFi | Col 5 TX level 5G | Col 6 WiFi filter mode | Col 7 5G filter mode | Col 8 Portion/ state | Col 9 FIG. 8/9 |
|---|---|---|---|---|---|---|---|---|---|
| Row 10 | 5G | Don't care | High | Off | Don't care | Off | Off | [3] | (d) |
| Row 11 | 5G | Don't care | High | On | Don't care | Off | RX filtering | [1] | |
| Row 12 | 5G | High | High | Don't care | High | RX filtering | Off | Cross system support ([5]) | |

TX Filtration

When reception on priority RAT system is GOOD and it's known that the reception conditions of the other RAT system is BAD, then the control logic 16 switches on TX filter $62_a$, $62_c$ during transmission to assist the other RAT system. This is illustrated in the portions of FIGS. 8 and 9 labelled (a) and (c) and examples of relevant conditions are illustrated at Rows 4 and 8 of Table 1.

The portion of FIG. 8 labelled (a), illustrates conditional addition filtering $62_a$ when the priority RAT system is WiFi. This corresponds to Row 4 of Table 1. The key conditions are at column 2 (RX level WiFi=High) and column 3 (RX level 5G=Low). The WiFi Tx filter $62_a$ is ON when WiFi Rx is GOOD and 5G Rx is BAD. The WiFi Rx is GOOD when WiFi Rx level is above Received signal strength threshold as indicated by first indicator 21 in FIG. 8(a). The 5G Rx is BAD when 5G Rx level is low as indicated by second indicator $22_a$ in FIG. 8(a).

As illustrated in Table 2, a first combination of the states of a first indicator 21 and a second indicator 22 is used to control the first filter $14_1$ to filter $62_a$ transmission in the first path to reduce interference to the second RAT $10_2$. The first combination is first indicator 21=priority Rx GOOD and second indicator $22_a$=non-priority Rx BAD.

TABLE 2

WiFi TX TRUTH Table:
AND logic gate (FIG. 8(a))

| WiFi Rx above threshold | 0 | 1 | 0 | 1 |
| 5 G Rx below threshold | 0 | 0 | 1 | 1 |
| Switch-on filter 62a | 0 | 0 | 0 | 1 |

The portion of FIG. 9 labelled (c), illustrates conditional addition filtering $62_c$ when the priority RAT system is 5G. This corresponds to Row 8 of Table 1. The key conditions are at column 3 (RX level 5G=High) and column 2 (RX level WiFi=Low). The 5G Tx filter $62_c$ is ON when 5G Rx is GOOD and WiFi Rx is BAD. The 5G Rx is GOOD when 5G TX power is NOT ABOVE (is BELOW) a threshold level for predictable WiFi RX interference as indicated by second indicator $22c$ in FIG. 8(c). The 5G Tx power is below the threshold because 5G Rx is GOOD. If 5G Rx was bad, then the 5G Tx power would have been increased by 3GPP closed loop power control. The WiFi Rx is BAD when WiFi Rx level is NOT ABOVE (is BELOW) a received signal strength threshold as indicated by first indicator $21_c$ in FIG. 8(c).

Aa illustrated in table 3 & 4, a third combination of the states of a first indicator 21 and a second indicator 22 is used to control the second filter $14_2$ to filter $62_c$ transmission in the second path to reduce interference to the first RAT $10_1$. The third combination is second indicator $22_c$=priority Rx GOOD (Tx low) and first indicator $21_c$=non-priority Rx BAD.

TABLE 3

5 G TX TRUTH Table:
NOR logic gate (FIG. 9(c))

| 5 G TX above threshold | 0 | 1 | 0 | 1 |
| WiFi Rx above threshold | 0 | 0 | 1 | 1 |
| Switch-on filter $62_c$ | 1 | 0 | 0 | 0 |

This could be re-expressed using an AND gate

TABLE 4

5 G TX TRUTH Table:
AND logic gate

| 5 G TX below threshold | 1 | 0 | 1 | 0 |
| WiFi Rx below threshold | 1 | 1 | 0 | 0 |
| Switch-on filter $62_c$ | 1 | 0 | 0 | 0 |

RX Filtration

When reception on the priority RAT system is GOOD and it's known that transmission of the other RAT system is PRESENT at interference levels (BAD for priority RAT system), then the control logic 16 switches on RX filter $62_b$, $62_d$ during reception to assist priority RAT system. This is illustrated in the portions of FIGS. 8 & 9 labelled (b) and (d) and examples of relevant conditions are illustrated at Rows 5 and 11 of Table 1.

The portion of FIG. 8 labelled (b), illustrates conditional addition filtering $62_b$ used when the priority RAT system is WiFi. This corresponds to Row 5 of Table 1. The key conditions are at column 2 (RX level WiFi=High) and column 5 (TX level 5G=High). The WiFi Rx filter $62_b$ is ON when WiFi Rx is GOOD and 5G Tx is PRESENT at interference levels.

The WiFi Rx is GOOD when WiFi Rx level is above Received signal strength threshold as indicated by first indicator 21 in FIG. 8(b).

The 5G Tx is PRESENT at interference levels when 5G TX power is above a threshold level for predictable WiFi RX interference as indicated by second indicator $22_b$ in FIG. 8(b).

As illustrated in Table 5, a second combination of the states of a first indicator 21 and a second indicator 22 is used to control the first filter $14_1$ to filter $62_b$ reception in the first path to reduce interference from the second RAT $10_2$. The second combination is first indicator 21=priority Rx GOOD and second indicator $22_b$=non-priority Tx PRESENT at interference levels.

TABLE 5

WiFi RX TRUTH Table:
AND logic gate (FIG. 8(b))

| | | | | |
|---|---|---|---|---|
| WiFi Rx above threshold | 0 | 1 | 0 | 1 |
| 5 G Tx above threshold | 0 | 0 | 1 | 1 |
| Switch-on filter $62_b$ | 0 | 0 | 0 | 1 |

The portion of FIG. 9 labelled (d), illustrates conditional addition filtering $62_d$ used when the priority RAT system is 5G. This corresponds to Row 11 of Table 1. The key conditions are at column 3 (RX level 5G=High) and column 4 (TX WiFi=ON). The 5G Rx filter $62_d$ is ON when 5G Rx is GOOD and WiFi Tx is PRESENT at interference levels.

The 5G Rx is GOOD when 5G Rx level is above sensitivity level threshold as indicated by second indicator $22_d$ in FIG. 8(d). The 5G Rx is GOOD when 5G TX power is NOT ABOVE (is BELOW) a threshold level for predictable WiFi RX interference as indicated by second indicator $22_c$ in FIG. 8(c). The 5G Tx power is below the threshold because 5G Rx is GOOD. If 5G Rx was bad, then the 5G Tx power would have been increased by 3GPP closed loop power control.

The WiFi Tx is PRESENT at interference levels when the WiFi transmitter is ON as indicated by first indicator $21_d$ in FIG. 8(d).

As illustrated in Table 6, a fourth combination of the states of a first indicator 21 and a second indicator 22 is used to control the second filter $14_2$ to filter $62_d$ reception in the second path to reduce interference from the first RAT $10_1$. The third combination is second indicator $22_d$=priority Rx GOOD and first indicator $21_d$=non-priority Tx PRESENT at interference levels.

TABLE 6

5 G RX TRUTH Table:
AND logic gate (FIG. 8(d))

| | | | | |
|---|---|---|---|---|
| 5 G Rx above threshold | 0 | 1 | 0 | 1 |
| WiFi Tx ON | 0 | 0 | 1 | 1 |
| Switch-on filter $62_d$ | 0 | 0 | 0 | 0 |

The control means 16 illustrated in FIGS. 8 and 9 can be used, for example, in RAT systems that have independent control (FIG. 3A) and in RAT systems that have at least some 'global' or common control (FIG. 3B).

Where there is common control, for example as described with reference to FIG. 3B, further options are available.

For example, the priority system can be controlled centrally.

Also, one RAT system can exercise control over another.

For example, the 5G system can control the WiFi system to use a Rx filter $62_b$.

According to table 1, the WiFi system can use a Rx filter $62_b$ at Rows 5 & 12 (column 6). At Row 5 of Table 1, WiFi has priority and the key conditions for switching ON WiFi Rx filter $62_b$ are at column 2 (RX level WiFi=High/Good) and column 5 (TX level 5G=High/present). At Row 12 of Table 1, 5G has priority and the key conditions for switching ON WiFi Rx filter $62_b$ are at column 2 (RX level WiFi=High/Good) and column 5 (TX level 5G=High/present). The priority RAT (5G) can therefore control filtering at the WIFI non-priority RAT.

According to table 1, the WiFi system can use a Rx filter $62_d$ at Rows 3 & 11 (column 7). At Row 11 of Table 1, 5G has priority and the key conditions for switching on the 5G Rx filter $62_d$ are at column 3 (RX level 5G=High/Good) and column 4 (TX WiFi=ON). At Row 3 of Table 1, WiFi has priority and the key conditions for switching on the 5G Rx filter $62_d$ are at column 3 (RX level 5G=High/Good) and column 4 (TX WiFi=ON). The non-priority RAT can therefore control filtering at the priority RAT.

It will be appreciated, from Table 1, that the circuitry 100 is configured such that:

a) a first combination of the states of the indicators 21, 22 is used to control the first filter to filter transmission in the first path to reduce interference to the second RAT [Row 4 of table 1], wherein the first combination is indicative of good reception in the first RAT and bad reception in the second RAT;

b) wherein a second combination of the states of the indicators 21, 22 is used to control the first filter to filter reception in the first path to reduce interference from the second RAT [Row 5, 12 of table 1] wherein the second combination is indicative of good reception in the first RAT and transmission is present from the second RAT present at interference levels;

c) wherein a third combination of the states of the indicators 21, 22 is used to control the second filter to filter transmission in the second path to reduce interference to the first RAT [Row 8 of Table 1] wherein the third combination is indicative of good reception in the second RAT and bad reception in the first RAT;

d) wherein a fourth combination of the states of the indicators 21, 22 is used to control the second filter to filter reception in the second path to reduce interference from the first RAT [Row 11, 3 of Table 1] wherein the fourth combination is indicative of good reception in the second RAT and transmission is present from the first RAT present at interference levels.

It's possible to pre-characterize the amount of TX interference as In-band blocker (5G TX as interferer) that would be tolerated. Knowing the interference level that will cause degrade, it's possible to map this to a threshold for 5G TX operation. So rather than looking at TX as ON/OFF as is the examples of WiFi, then on 5G the absolute level is known.

FIG. 10 illustrates an example of a chipset 200 comprising the circuitry 100 as described. The chipset can, for example, be associated with a filter 14 or can be associated with a RAT sub-system.

FIG. 11 illustrates an example of an apparatus 210 comprising the circuitry 100 as described. In some examples the apparatus 210 is an electronic apparatus. Examples of electronic apparatus include but are not limited to user equipment, mobile stations, hand-held telephones, watches, wearables etc. In some examples, the apparatus 210 is a network access node such as a base station. Examples of base stations include NodeB (and evolutions NodeB such as gNB).

The apparatus 210 can, for example, be a laptop, portable computer, tablet computer, wearable electronic devices, gNB, IoT devices, navigational electronic devices, gaming devices, smart phones, mobile phones, consumer electronics devices, televisions, routers, customer premise equipment (CPE), network devices, etc.

FIG. 12 illustrates an example of a method 220.

At block 222 of the method 220, the method 220 comprises obtaining a first indicator 21, dependent on a first radio access technology (RAT) system, wherein the first indicator is one of a predetermined number of states.

At block 224 of the method 220, the method 220 comprises obtaining a second indicator 22, dependent on a second RAT system wherein the second indicator is one of a predetermined number of states.

At block 226 of the method 220, the method 220 comprises using a combination of the states of the first indicator 21 and the second indicator 22 to control at least characteristics of filtration for the first RAT system.

FIG. 13 illustrates an example of a controller 250 suitable for use as controller 16 or as controller 40. Implementation of a controller 250 may be as controller circuitry. The controller 250 may be implemented in hardware alone, have certain aspects in software including firmware alone or can be a combination of hardware and software (including firmware).

As illustrated in FIG. 13 the controller 250 may be implemented using instructions that enable hardware functionality, for example, by using executable instructions of a computer program 256 in a general-purpose or special-purpose processor 252 that may be stored on a computer readable storage medium (disk, memory etc) to be executed by such a processor 252.

The processor 252 is configured to read from and write to the memory 254. The processor 252 may also comprise an output interface via which data and/or commands are output by the processor 252 and an input interface via which data and/or commands are input to the processor 252.

The memory 254 stores a computer program 256 comprising computer program instructions (computer program code) that controls the operation of the apparatus 256 when loaded into the processor 252. The computer program instructions, of the computer program 256, provide the logic and routines that enables the apparatus to perform the methods illustrated in the preceding Figs. The processor 252 by reading the memory 254 is able to load and execute the computer program 256.

In some examples of the implementation the various tables and thresholds are part of the memory 254 (or another memory) accessible by the controller.

The apparatus 256 therefore comprises:
at least one processor 252; and
at least one memory 254 including computer program code
the at least one memory 254 and the computer program code configured to, with the at least one processor 252, cause the apparatus 256 at least to perform:
processing a combination of the states of a first indicator and a second indicator to control at least characteristics of filtration for the first RAT system, wherein
the first indicator is dependent on a first radio access technology (RAT) system and is one of a predetermined number of states; and
the second indicator is dependent on a second RAT system and is one of a predetermined number of states.

As illustrated in FIG. 14, the computer program 256 may arrive at the apparatus 256 via any suitable delivery mechanism 258. The delivery mechanism 258 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 256. The delivery mechanism may be a signal configured to reliably transfer the computer program 256. The apparatus 256 may propagate or transmit the computer program 256 as a computer data signal.

Computer program instructions for causing an apparatus to perform at least the following or for performing at least the following:
processing a combination of the states of a first indicator and a second indicator to control at least characteristics of filtration for the first RAT system, wherein
the first indicator is dependent on a first radio access technology (RAT) system and is one of a predetermined number of states; and
the second indicator is dependent on a second RAT system and is one of a predetermined number of states.

The computer program instructions may be comprised in a computer program, a non-transitory computer readable medium, a computer program product, a machine readable medium. In some but not necessarily all examples, the computer program instructions may be distributed over more than one computer program.

Although the memory 254 is illustrated as a single component/circuitry it may be implemented as one or more separate components/circuitry some or all of which may be integrated/removable and/or may provide permanent/semi-permanent/dynamic/cached storage.

Although the processor 252 is illustrated as a single component/circuitry it may be implemented as one or more separate components/circuitry some or all of which may be integrated/removable. The processor 252 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The controller and other circuitry may be implemented in dedicated hardware instead of using a processor. This can increase speed. It can be desirable to have hardware triggers programmed by software. Examples of such hardware includes sequencers and/or timer units.

The blocks illustrated in the Figs may represent steps in a method and/or sections of code in the computer program 256. The illustration of a particular order to the blocks does not necessarily imply that there is a required or preferred order for the blocks and the order and arrangement of the block may be varied. Furthermore, it may be possible for some blocks to be omitted.

Where there a set comprising members of the set, then in at least some examples, the specific members can be individually labelled in text and drawings using a common reference numeral with a distinct subscript. In context, the set can be labelled in text and drawings using the common reference numeral without the subscript or by using multiple versions of the common reference numeral with different subscripts. Thus, for example, the set of filters 14 comprise the first filter $14_1$ and the second filter $14_2$.

In the preceding examples, and other examples, the circuitry 100 comprises (alone or in combination with other features):
- a first radio path comprising a first filter configured for a first radio access technology (RAT) system;
- a second radio path comprising a second filter configured for a second radio access technology (RAT) system different to the first RAT system;
- means for controlling
- the first filter to filter transmission in the first path to reduce interference to the second RAT, when there is good reception in the first RAT and bad reception in the second RAT; and/or
- the first filter to filter reception in the first path to reduce interference from the second RAT when there is good reception in the first RAT and transmission is present from the second RAT present at interference levels.

In the preceding examples, and other examples, the circuitry 100 comprises (alone or in combination with other features):
- a first radio path comprising a first filter configured for a first radio access technology (RAT) system;
- a second radio path comprising a second filter configured for a second radio access technology (RAT) system different to the first RAT system;
- means for augmenting filtration by the first filter to filter transmission in the first path to reduce interference to the second RAT, when there is good reception in the first RAT and bad reception in the second RAT; and/or augmenting filtration by the first filter to filter reception in the first path to reduce interference from the second RAT when there is good reception in the first RAT and transmission is present from the second RAT present at interference levels.

In the preceding examples, and other examples, the circuitry 100 comprises (alone or in combination with other features):
- a first radio path comprising a first filter configured for a first radio access technology (RAT) system;
- a second radio path comprising a second filter configured for a second radio access technology (RAT) system different to the first RAT system;
- means for controlling
  a) the first filter to filter transmission in the first path to reduce interference to the second RAT, when there is good reception in the first RAT and bad reception in the second RAT;
  b) the first filter to filter reception in the first path to reduce interference from the second RAT when there is good reception in the first RAT and transmission is present from the second RAT present at interference levels;
  c) the second filter to filter transmission in the second path to reduce interference to the first RAT when there is good reception in the second RAT and bad reception in the first RAT; and
  d) the second filter to filter reception in the second path to reduce interference from the first RAT when there is good reception in the second RAT and transmission is present from the first RAT present at interference levels.

In the preceding examples, and other examples, the circuitry 100 comprises (alone or in combination with other features):
- a first radio path comprising a first filter configured for a first radio access technology (RAT) system;
- a second radio path comprising a second filter configured for a second radio access technology (RAT) system different to the first RAT system;
  a) means for augmenting filtration by the first filter to filter transmission in the first path to reduce interference to the second RAT, when there is good reception in the first RAT and bad reception in the second RAT;
  b) means for augmenting filtration by the first filter to filter reception in the first path to reduce interference from the second RAT when there is good reception in the first RAT and transmission is present from the second RAT present at interference levels;
  c) means for augmenting filtration by the second filter to filter transmission in the second path to reduce interference to the first RAT when there is good reception in the second RAT and bad reception in the first RAT; and
  d) means for augmenting filtration by the second filter to filter reception in the second path to reduce interference from the first RAT when there is good reception in the second RAT and transmission is present from the first RAT present at interference levels.

Where a structural feature has been described, it may be replaced by means for performing one or more of the functions of the structural feature whether that function or those functions are explicitly or implicitly described.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. Circuitry comprising:
   at least one processor; and
   at least one memory including computer program code, the at least one memory and the computer program code configured to, with the at least one processor, cause the circuitry at least to perform:
   obtain a first indicator, dependent on a first radio access technology (RAT) system, wherein the first indicator is one of a predetermined number of states;
   obtain a second indicator, dependent on a second RAT system, different to the first RAT system, wherein the second indicator is one of a predetermined number of states; and
   use a combination of the states of the first indicator and the second indicator to control characteristics of at least a first filter of a first radio path, the first filter being configured for the first RAT system to apply filtration when:
   the first indicator is indicative of a good quality of communication using the first RAT system such that filtering by the first RAT system will not have a negative impact on the first RAT system; and
   the second indicator is indicative of (i) interference between the first RAT system and the second RAT system or (ii) satisfaction of a condition dependent upon the second RAT system.

2. Circuitry as claimed in claim 1 wherein, when the first radio path is being used for transmission, the condition dependent upon the second RAT system is satisfied when reception in the second RAT system is bad.

3. Circuitry as claimed in claim 1, wherein, when the first radio path is being used for reception, the condition dependent upon the second RAT system is satisfied when transmission in the second RAT system is present at interference levels.

4. Circuitry as claimed in claim 1 wherein the at least one memory and the computer program code are configured to, with the at least one processor, cause the circuitry to control the first filter by: adding, removing and/or adjusting a component of the first filter.

5. Circuitry as claimed in claim 1, wherein the first RAT system is one of a 3GPP network or a WiFi network and wherein the second RAT system is the other one of a 3GPP network or a WiFi network.

6. Circuitry as claimed in claim 1, wherein a second radio path comprises a second filter configured for a second radio access technology (RAT) system different to the first RAT system, and wherein the at least one memory and the computer program code are further configured to, with the at least one processor, cause the circuitry to control:
   a) the first filter to filter transmission in the first path to reduce interference to the second RAT, when there is good reception in the first RAT and bad reception in the second RAT;
   b) the first filter to filter reception in the first path to reduce interference from the second RAT when there is good reception in the first RAT and transmission is present from the second RAT at interference levels;
   c) the second filter to filter transmission in the second path to reduce interference to the first RAT when there is good reception in the second RAT and bad reception in the first RAT; and d) the second filter to filter reception in the second path to reduce interference from the first RAT when there is good reception in the second RAT and transmission is present from the first RAT at interference levels.

7. Circuitry as claimed in claim 6, wherein the first filter is controlled differently to filter transmission in the first path to reduce interference to the second RAT and to filter reception in the first path to reduce interference from the second RAT; and/or wherein the second filter is controlled differently to filter transmission in the second path to reduce interference to the first RAT and to filter reception in the second path to reduce interference from the first RAT.

8. A chipset for radio communications comprising the circuitry of claim 1.

9. A user equipment or network access node for radio communications comprising the circuitry of claim 1.

10. Circuitry as claimed in claim 1, wherein the condition is dependent on whether the filtration for the first RAT system is for transmission or reception.

11. Circuitry as claimed in claim 1, wherein the circuitry is configured to use a combination of the states of the first indicator and the second indicator to control characteristics of at least a second filter of a second radio path, the second filter being configured for the second RAT system to apply filtration when the first indicator is indicative of interference between the first RAT system and the second RAT system and the second indicator is indicative of a good quality of reception or transmission in the second RAT system such that filtering by the second RAT system will not have a negative impact on the first second system.

12. A method comprising:
obtaining a first indicator, dependent on a first radio access technology (RAT) system, wherein the first indicator is one of a predetermined number of states;
obtaining a second indicator, dependent on a second RAT system, wherein the second indicator is one of a predetermined number of states; and
using a combination of the states of the first indicator and the second indicator to control at least characteristics of filtration for the first RAT system by configuring a first filter for applying filtration when:
the first indicator is indicative of a good quality of communication using the first RAT system such that filtering by the first RAT system will not have a negative impact on the first RAT system; and
the second indicator is indicative of (i) interference between the first RAT system and the second RAT system or (ii) satisfaction of a condition dependent upon the second RAT system.

13. A method as claimed in claim 12, wherein a second radio path comprises a second filter configured for a second radio access technology (RAT) system different to the first RAT system, and wherein the method further comprising controlling:
a) the first filter to filter transmission in the first path to reduce interference to the second RAT, when there is good reception in the first RAT and bad reception in the second RAT;
b) the first filter to filter reception in the first path to reduce interference from the second RAT when there is good reception in the first RAT and transmission is present from the second RAT at interference levels;
c) the second filter to filter transmission in the second path to reduce interference to the first RAT when there is good reception in the second RAT and bad reception in the first RAT; and
d) the second filter to filter reception in the second path to reduce interference from the first RAT when there is good reception in the second RAT and transmission is present from the first RAT at interference levels.

14. A method as claimed in claim 12, further comprising using the combination of the states of the first indicator and the second indicator to control characteristics of at least a second filter of a second radio path, the second filter being configured for the second RAT system to apply filtration when the first indicator is indicative of interference between the first RAT system and the second RAT system and the second indicator is indicative of a good quality of reception or transmission in the second RAT system such that filtering by the second RAT system will not have a negative impact on the first second system.

15. A non-transitory computer-readable storage medium configured to store a computer program that, when run on a computer, performs:
processing a combination of states of a first indicator and a second indicator to control at least characteristics of filtration for a first radio access technology (RAT) system,
wherein the first indicator is dependent on the RAT system and is one of a predetermined number of states,
wherein the second indicator is dependent on a second RAT system and is one of a predetermined number of states, and
wherein a first filter is configured, in response to processing the combination of states of the first and second indicators, for applying filtration when the first indicator is indicative of a good quality of communication using the first RAT system such that filtering by the first RAT system will not have a negative impact on the first RAT system and the second indicator is indicative of (i) interference between the first RAT system and the second RAT system or (ii) satisfaction of a condition dependent upon the second RAT system.

16. The non-transitory computer-readable storage medium as claimed in claim 15, wherein a second filter is configured, in response to processing the combination of states of the first and second indicators, for applying filtration when the first indicator is indicative of interference between the first RAT system and the second RAT system and the second indicator is indicative of a good quality of reception or transmission in the second RAT system such that filtering by the second RAT system will not have a negative impact on the first second system.

* * * * *